(12) United States Patent
Barbosa, Jr. et al.

(10) Patent No.: US 11,524,591 B2
(45) Date of Patent: Dec. 13, 2022

(54) ELECTRIC VEHICLE

(71) Applicant: Ford Global Technologies, LLC, Dearborn, MI (US)

(72) Inventors: Jose Carlos Barbosa, Jr., Federacao/Salvador (BR); Narques Silva, Salvador (BR); Ricardo Sugimoto, Camacari (BR)

(73) Assignee: Ford Global Technologies, LLC, Dearborn, MI (US)

( * ) Notice: Subject to any disclaimer, the term of this patent is extended or adjusted under 35 U.S.C. 154(b) by 805 days.

(21) Appl. No.: 16/317,118

(22) PCT Filed: Jul. 13, 2016

(86) PCT No.: PCT/US2016/041962
§ 371 (c)(1),
(2) Date: Jan. 11, 2019

(87) PCT Pub. No.: WO2018/013094
PCT Pub. Date: Jan. 18, 2018

(65) Prior Publication Data
US 2020/0207225 A1 Jul. 2, 2020

(51) Int. Cl.
*B60L 53/16* (2019.01)
*B60L 53/12* (2019.01)
(Continued)

(52) U.S. Cl.
CPC ............... *B60L 53/16* (2019.02); *B60L 53/12* (2019.02); *B60L 53/51* (2019.02); *B62H 3/00* (2013.01);
(Continued)

(58) Field of Classification Search
CPC .......... B60L 53/16; B60L 53/12; B60L 53/51; B60L 2200/24; B62H 3/00;
(Continued)

(56) References Cited

U.S. PATENT DOCUMENTS 6,347,681 B1 2/2002 Patmont et al.
6,851,498 B1 2/2005 Sauve
(Continued)

FOREIGN PATENT DOCUMENTS

BR 102014012704 A2 12/2015
CN 201923263 U 8/2011
(Continued)

OTHER PUBLICATIONS

Second Chinese Office Action as issued by the Chinese Patent Office dated Nov. 12, 2020 (in English and Chinese).
(Continued)

*Primary Examiner* — Paul Dinh
(74) *Attorney, Agent, or Firm* — Brandon Hicks; Bejin Bieneman PLC

(57) ABSTRACT

A vehicle includes a body and a cover rotatably connected to the body. The vehicle further includes a control bar rotatably connected to the cover. The cover is rotatable onto the body to put the cover in the stowed position from an extended position. The bar is between the cover and the body when the bar is in the stowed position.

10 Claims, 10 Drawing Sheets

(51) Int. Cl.
    *B60L 53/51*         (2019.01)
    *B62H 3/00*         (2006.01)
    *B62K 15/00*        (2006.01)
    *H02J 7/00*         (2006.01)
    *H02J 7/02*         (2016.01)
    *H02J 7/35*         (2006.01)
    *B62K 3/00*         (2006.01)

(52) U.S. Cl.
    CPC .......... *B62K 15/006* (2013.01); *H02J 7/0045* (2013.01); *H02J 7/02* (2013.01); *H02J 7/35* (2013.01); *B60L 2200/24* (2013.01); *B62K 3/002* (2013.01); *B62K 2202/00* (2013.01)

(58) Field of Classification Search
    CPC ............ B62H 2003/005; B62K 15/006; B62K 3/002; B62K 2202/00; B62K 2204/00; H02J 7/0045; H02J 7/02; H02J 7/35; Y02T 10/70; Y02T 10/7072; Y02T 90/12; Y02T 90/14; B62J 17/02
    USPC ........................................................ 320/109
    See application file for complete search history.

(56) References Cited

U.S. PATENT DOCUMENTS

| | | |
|---|---|---|
| 7,021,413 B1 | 4/2006 | Lee |
| 2003/0029652 A1 | 2/2003 | Lan |
| 2010/0116572 A1 | 5/2010 | Schmitt et al. |
| 2011/0181233 A1* | 7/2011 | Mino ...................... B60L 53/51 320/101 |
| 2015/0014076 A1 | 1/2015 | Azizi |
| 2015/0321722 A1 | 11/2015 | Dadoosh et al. |
| 2019/0263281 A1* | 8/2019 | Wang ...................... B60L 53/16 |
| 2020/0189683 A1* | 6/2020 | Chen .................... B62K 15/006 |

FOREIGN PATENT DOCUMENTS

| | | |
|---|---|---|
| CN | 102632952 B | 9/2013 |
| CN | 103387026 A | 11/2013 |
| CN | 203780699 U | 8/2014 |
| CN | 204952216 U | 1/2016 |
| CN | 205220914 U | 5/2016 |
| WO | 0236419 A1 | 5/2002 |

OTHER PUBLICATIONS

Notification of Transmittal of the International Search Report and the Written Opinion of the International Searching Authority (ISA) regarding Application No. PCT/US2016/041962 dated Nov. 18, 2016 (16 pages).

Swiftmile—Swiftstation Overview, "The Swiftmile Turn-Key Solution" (8 pages).

Link Scooter System, "Rent, Ride and Return", retrieved from Internet URL: http://psipunk.com/link-scooter-system-rent-ride-and-return/ (4 pages).

China Notification of First Office Action dated Mar. 24, 2020 re Appl. No. 201680087667.

\* cited by examiner

ELECTRIC VEHICLE

BACKGROUND

Even small electric vehicles can be too large and cumbersome for a user to own and operate. For example, the amount of storage space used by an electric vehicle when not in use may be undesirable or impractical to users. Furthermore, users may lack adequate storage for the vehicles, reducing the likelihood that the user would own and operate an electric vehicle. Likewise, a user may not be able to navigate a large or cumbersome electric vehicle in areas that are off-limits to larger, e.g., multi-passenger, vehicles, and users may not be able to store a larger and cumbersome electric vehicle at a destination location, e.g., a place of work.

DETAILED DESCRIPTION

An electric vehicle is movable from a stowed position in which the vehicle can be stored compactly to an extended position in which a user can operate the vehicle. In the stowed position, the vehicle has a reduced profile and can be stored compactly in a station until requested by a user. In the extended position, the vehicle can be operated by the user to move in areas where traditional vehicles (e.g., automobiles) cannot travel, e.g., a sidewalk, a park, a corporate campus, etc. The vehicle includes a cover and a bar that folds into the cover when the vehicle is in the stowed position, reducing the profile of the vehicle. The cover and the bar can be extended to allow the user to operate the vehicle when the vehicle is in the extended position. The vehicle includes a processor programmed to actuate motors to move the vehicle without input from the user, i.e., autonomously.

Figure 1:
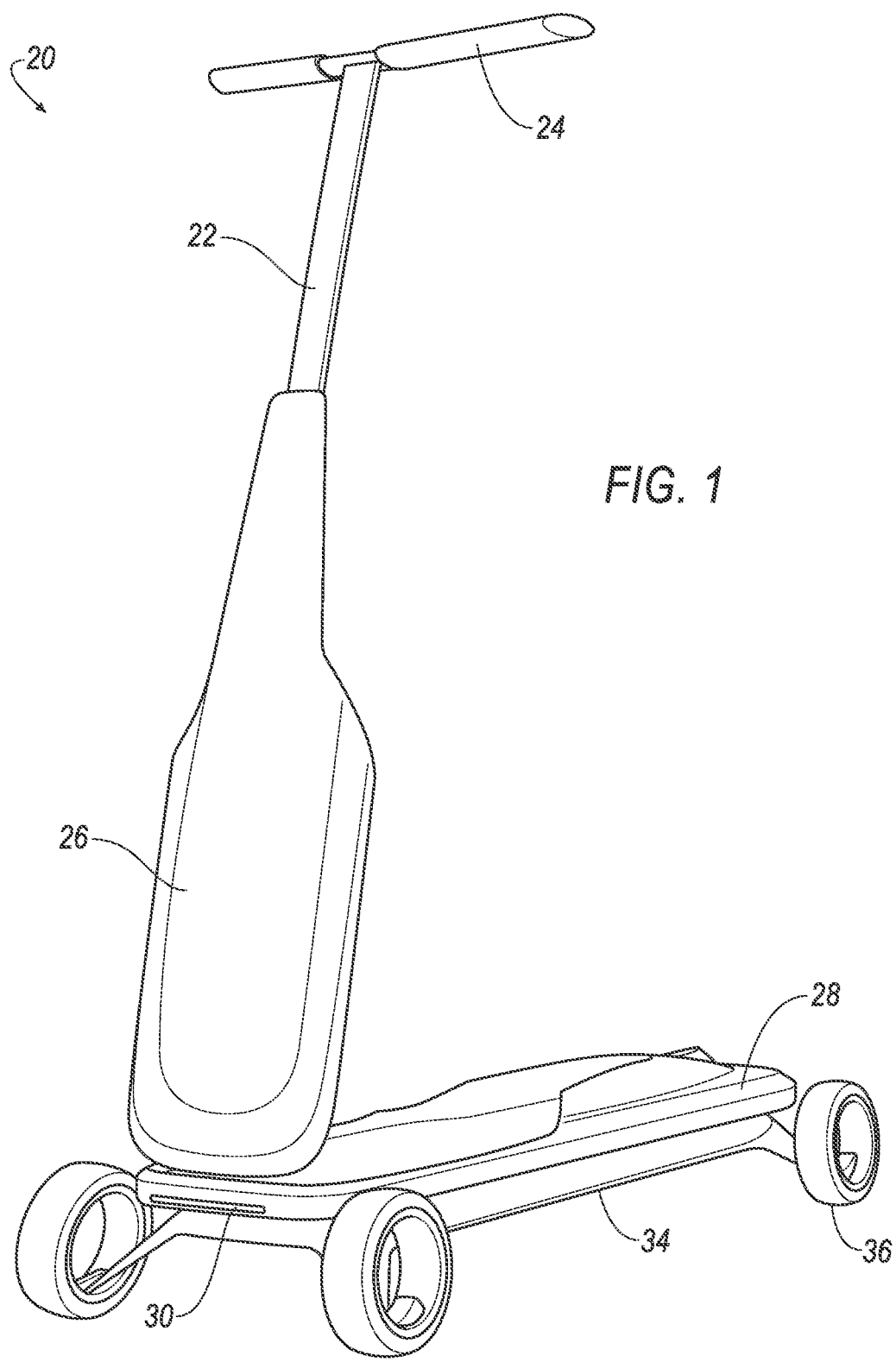
FIG. 1 is a view of an example vehicle in an extended position.

FIG. 1 illustrates the vehicle 20 in an extended position. The vehicle 20 is movable from a stowed position (see FIG. 2) to an extended position as shown in FIG. 1. The vehicle 20 includes a control bar 22. The bar 22 is an elongate member that is extendable from a stowed position to an extended position. The user moves the bar 22 to steer, accelerate, and brake the vehicle 20. The bar 22 is rotatably connected to a cover 26, and can be moved from the stowed position, wherein the bar 22 is disposed adjacent to the cover 26, to the extended position, wherein the bar 22 is rotated to extend away from the cover 26. The bar 22 is rotatably connected to the cover 26 using, e.g., a hinge, a universal joint, etc. The rotatable connection (e.g., the hinge) allows the bar 22 to rotate from the stowed position to the extended position. In the stowed position, the bar 22 is disposed in the cover 26, reducing the profile of the vehicle 20 and allowing for compact storage of the vehicle 20. In the extended position, the bar 22 can extend to a length at which a user can hold the bar 22 to operate the vehicle 20.

The vehicle 20 is in the "extended position" when the bar 22, hand grips 24, and the cover 26 are each in their respective extended positions. When the vehicle 20 is in the extended position, the user can operate the vehicle 20 by standing on a body 28 and moving the bar 22. The bar 22 and the cover 26 each are in their respective extended position, i.e., the bar 22 extends from the cover 26 and the cover 26 is at a nonzero angle with the body 28. The hand grips 24 can be in the extended position, i.e., at a nonzero angle with the bar 22. That is, the hand grips 24 can be extended to allow the user to grab the hand grips and move the bar 22.

The vehicle 20 is in the "stowed position." when the bar 22, the hand grips 24, and the cover 26 are each in their respective stowed positions. When the vehicle 20 is in the stowed position, the vehicle 20 can be compactly stored, e.g., when the vehicle 20 is not in use by a user. In the stowed position, the bar 22, the cover 26, the body 28, and the chassis 34 are stacked, and the bar 22 is between the cover 26 and the body 28. That is, the bar 22 is placed in the stowed position and folded into the cover 26, and the cover 26 is folded onto the body 28. The hand grips 24 can be folded into the stowed position, i.e., defining an acute angle with the bar 22.

The term "profile" with respect to the vehicle 20 means a maximum height of the vehicle 20 above the ground when at least three wheels 36 of the vehicle 20 are touching the ground. A smaller maximum height of the vehicle 20 produces a "reduced" or "smaller" profile. That is, the profile of the vehicle 20 in the stowed position is lower than the profile of the vehicle 20 in the extended position because the bar 22 and the cover 26 are rotated onto the body 28 to reduce the profile of the vehicle 20. When the vehicle 20 is in the extended position, the cover 26 and the bar 22 increase the height of the vehicle 20, increasing the maximum height of the vehicle 20, producing a larger profile. A reduced profile, e.g., when the vehicle 20 is in the stowed position, allows for more compact storage of the vehicle 20 and/or stacked storage of a plurality of vehicles 20.

The vehicle 20 includes at least one hand grip 24 attached to the bar 22. The example vehicle 20 of FIG. 1 has two hand grips 24. The hand grips 24 allow the user to rotate and move the bar 22 and to maintain balance when the vehicle 20 is moving. The hand grips 24 are rotatably connected to the bar 22. The hand grips 24 can be extendable from a stowed position to an extended position. In the stowed position, the hand grips 24 can fold along sides of the bar 22 to conserve space when the bar 22 is folded into the cover 26. In the extended position, the hand grips 24 can extend out from the bar 22 at a substantially nonzero angle, e.g., substantially perpendicular to the bar 22, so that the user can grab the hand grips 24 to steer the vehicle 20. The hand grips 24 can be rotatably connected to the bar 22 via, e.g., a hinge, a universal joint, etc.

The vehicle 20 includes the cover 26. The cover 26 is rotatably connected to the bar 22 and to a body 28, described below. The cover 26 is movable from a stowed position to an extended position. The cover has a cover length 26L. The cover 26 is typically formed of any material that is suitably lightweight and durable, e.g., a polymer sheet that extends along a body length 28L of the body 28 to cover the body 28 and the bar 22 when the vehicle 20 is in the stowed position. The cover length 26L and the body length 28L can be substantially similar, i.e., approximately the same length. The cover 26 is arranged to receive the bar 22 and the hand grips 24 when the bar 22 is moved into the stowed position. The cover 26 can protect the body 28 and the bar 22 from environmental hazards, e.g., inclement weather. The cover 26 is rotatably connected to the body 28 via, e.g., a hinge, a universal joint, etc.

The vehicle 20 includes the body 28. The body 28 is a housing for vehicle 20 components, e.g., a battery 32, a processor 40, etc. A user typically stands on the body 28 when using the vehicle 20. The body 28 can house a processor 40, as described below. The body 28 may include a light 30, e.g., a light-emitting diode (LED), to illuminate a roadway in front of the vehicle 20. The body 28 is rotatably connected to the cover 26 to allow the cover 26 to move from the stowed position to the extended position. When the cover 26 is in the stowed position, the cover 26 and the body 28 may be stacked to reduce the profile of the vehicle 20 for compact storage. For example, the cover 26 may be rotated onto the body 28 to reduce the maximum height of the cover 26 when the cover 26 is in the stowed position. The body 28 can include an electrical connector (not shown), e.g., a wire, that electrically connects the battery 32 to other vehicle 20 components, e.g., the light 30.

Figure 3:
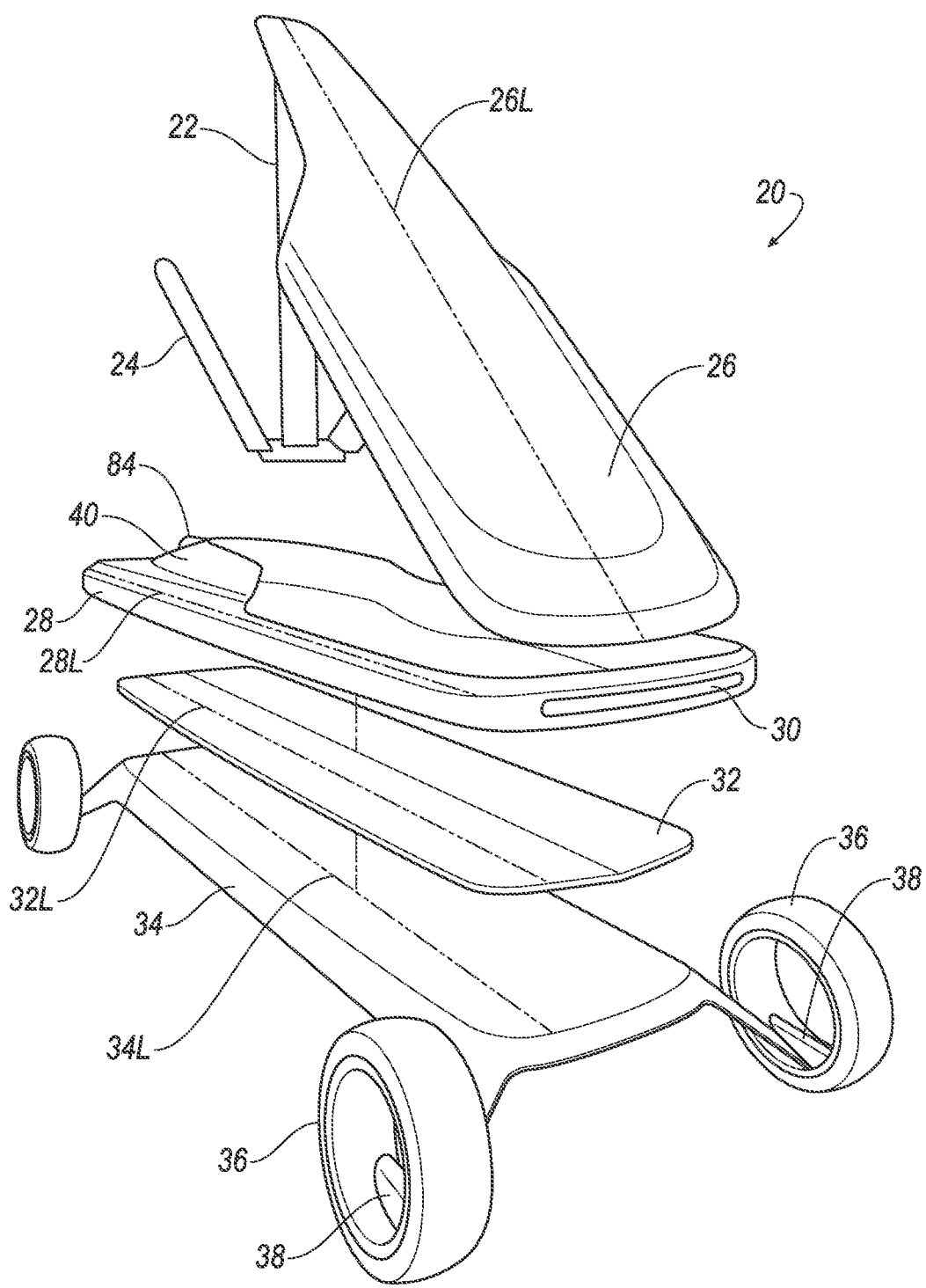
FIG. 3 is an exploded view of the example vehicle of FIG. 1.

The vehicle 20 includes the battery 32, as shown in FIG. 3. The battery 32 stores electricity to power components of the vehicle 20, e.g., the light 30, a motor 38, etc. The battery 32 can be disposed beneath the body 28 to prevent the user from standing on the battery. The battery 32 can be a rechargeable battery 32, e.g., a lithium-ion battery, a nickel-metal-hydride battery, etc. The battery 32 can be arranged to recharge wirelessly, i.e., with inductive charging from an electromagnetic field generated by, e.g., a charging pad 60, as described below. The battery has a battery length 32L. The battery 32 can be arranged to connect to a charging port 84 disposed in the body 28. The charging port 84 is arranged to receive an electrical connection, e.g., a power cable 48 as described below and shown in FIG. 6, to charge the battery 32.

The vehicle 20 includes a chassis 34. The chassis 34 supports components of the vehicle 20, e.g., the battery 32, the body 28, the cover 26, etc. The chassis 34 can be disposed beneath the battery 32 and the body 28. The chassis 34 can include an electrical connector (not shown), e.g., a wire, to electrically connect the battery 32 to other vehicle 20 components, e.g., the motors 38. The chassis 34 has a chassis length 34L. When the vehicle 20 is in the stowed position, the chassis 34, the battery 32, the body 38, the bar 22, and the cover 26 are compactly arranged to obtain a minimum profile of the vehicle 20. For example, the elements 22, 26, 32, 34, and 38 may be stacked, i.e., arranged to contact one another in a generally horizontal fashion, as described below and shown in FIG. 3.

The vehicle 20 includes a plurality of wheels 36. The wheels 36 allow the vehicle 20 to move. The wheels 36 are connected to the chassis 34. The bar 22 is arranged to turn the wheels 36 to steer the vehicle 20. The wheels 36 can be constructed of, e.g., a rubber, a plastic, carbon fiber, a metal, etc. The example of FIG. 1 includes four wheels 36.

The vehicle 20 includes at least one motor 38 arranged to rotate at least one of the wheels 36, described below and shown in FIG. 5. The example of FIG. 1 includes four motors 38, each motor 38 arranged to rotate one of the wheels 36. As the user moves the bar 22, the processor 40 is programmed to selectively actuate at least one of the motors 38 to turn the vehicle 20, as described below and shown in FIGS. 4 and 5. The motors 38 can be, e.g., electric motors.

The vehicle 20 includes the processor 40 programmed to move the vehicle 20 to a location requested by a user, as shown in FIG. 3. The processor 40 includes programming to actuate the motors 38 to move the wheels 36. For example, when the user turns the bar 22 to turn the vehicle 20, the processor 40 instructs the specific motors 38 to rotate the specific wheels 36 to turn the vehicle 20.

The vehicle 20 can include at least one data collector 58 to collect data. For example, one of the data collectors 58 can collect data about movement of the bar 22, and the processor 40 uses the data to actuate the motors 38 to turn and move the wheels 36 according to the movement of the bar 22. That is, the data collectors 58 collect data about the rotation of the bar 22, and the processor 40 actuates the motors 38 to turn the vehicle according to the rotation of the bar 22. In another example, the data collectors 58 detects that the user pushed the bar 22 forward, and the processor 40 instructs the motors 38 to rotate the wheels 36 forward to move the vehicle 20 forward. The data collectors 58 can include, e.g., rotation sensors to detect rotation of the bar 22, sensors to detect lateral and longitudinal movement of the bar 22, sensors to detect vehicle 20 speed, acceleration, position, component functionality, location, etc. Other data collectors 58 could include cameras, motion detectors, etc.

The data collectors 58 can detect whether the vehicle 20 is in the stowed position or the extended position. That is, one of the data collectors 58 may be an angle sensor 58 that detects the position of the rotatable connection (e.g., the hinge) connecting the cover 26 to the body 28. Based on the data from the angle sensor 58, when the processor 40 determines that the angle of the rotatable connection is beyond an angle threshold, i.e., the cover 26 defines an angle with the body 28 beyond an angle threshold, the processor 40 can determine that the cover 26 has moved from the stowed position to the extended position. Similarly, the processor 40 can use an angle sensor 58 in the rotatable connection between the bar 22 and the cover 26 to determine whether the bar 22 is in the stowed position or the extended position. Thus, the processor 40 can determine whether the vehicle 20 is in the stowed position or the extended position based on data from data collectors 58 regarding the position of the bar 22 and the cover 26.

Figure 2:
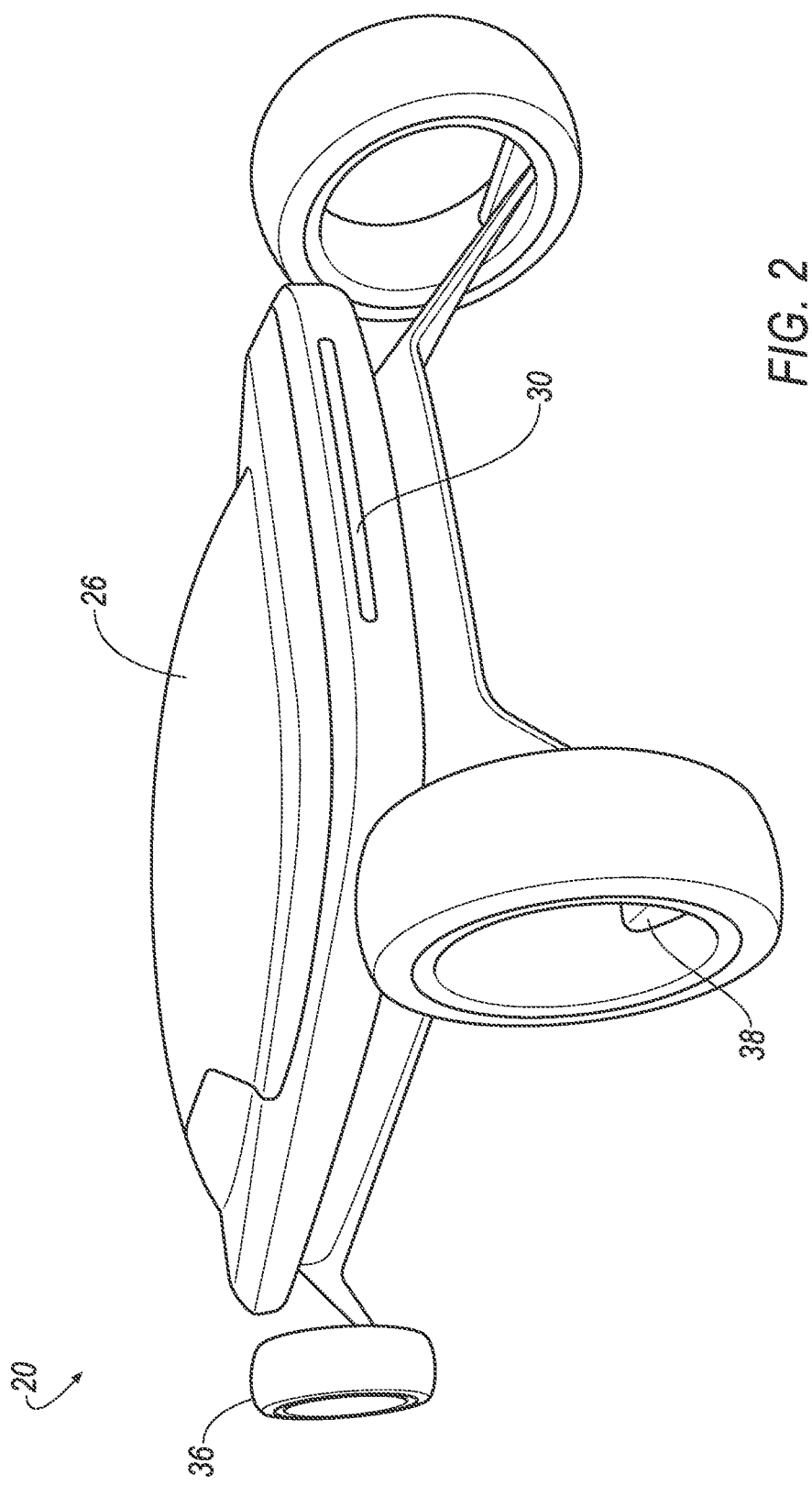
FIG. 2 is a view of the example vehicle of FIG. 1 in a stowed position.

FIG. 2 illustrates the vehicle 20 in a stowed position. The processor 40 can be programmed to move the vehicle 20 in the stowed position. That is, while the user cannot access the bar 22 to move the vehicle 20, the processor 40 can still receive instructions to move the vehicle 20 to a predetermined location, e.g., to the location of the user. The processor 40 can receive instructions from, e.g., a user device 74 (e.g., a phone, a tablet, etc.) over a wireless communications network 72 (e.g., WiFi, Bluetooth, a cellular network, as is known as described below and shown in FIG. 9. Thus, the vehicle 20 can move to a location without input from a user moving the bar 22, i.e., substantially autonomously.

Figure 4:
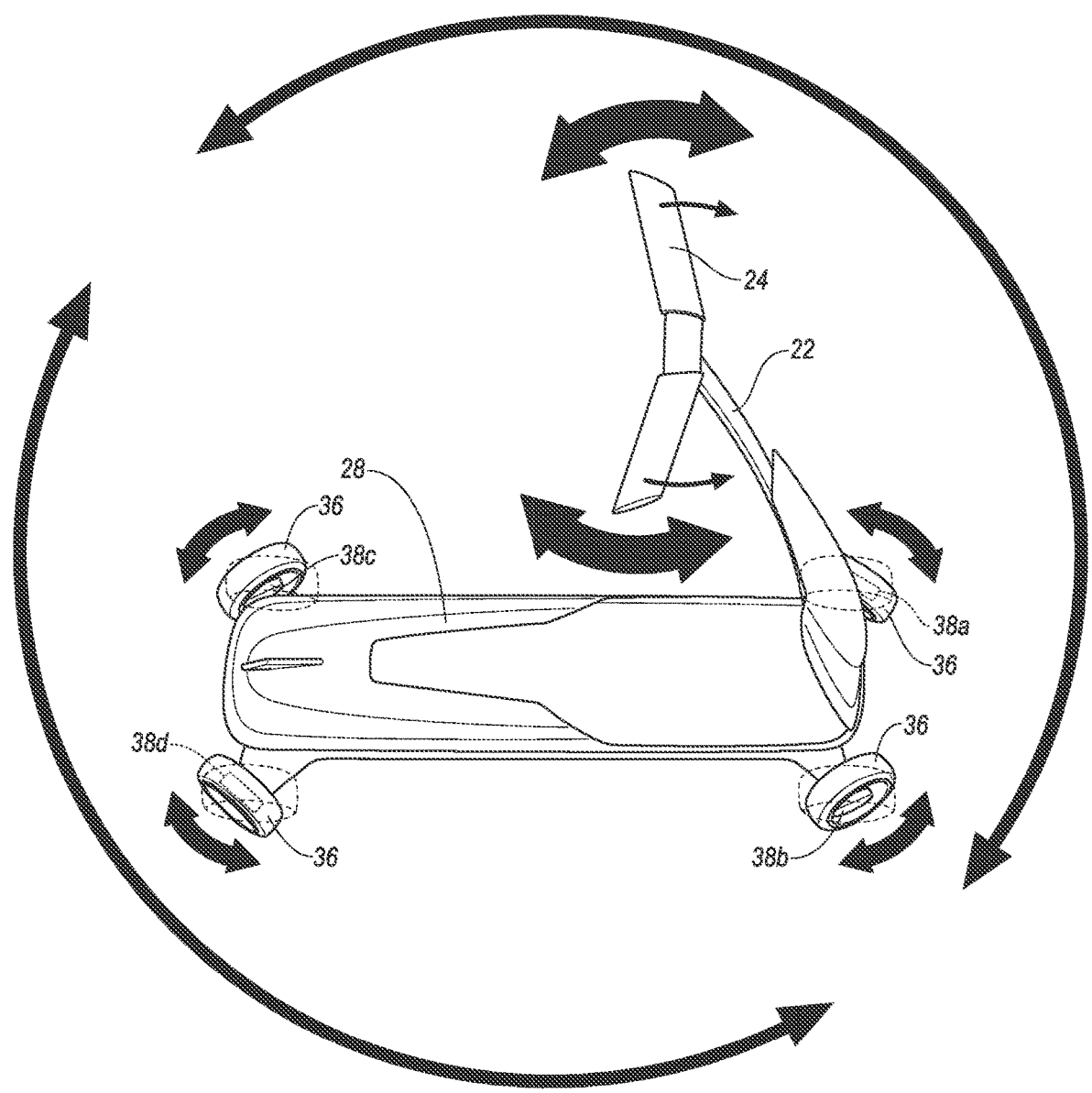
FIG. 4 is a view of the example vehicle of FIG. 1 turning.

FIG. 4 illustrates the vehicle 20 performing a turn. To turn the vehicle 20, the controller selectively actuates the motors 38 to move at least one of the wheels 36 and to stop at least one of the wheels 36, rotating the path of travel of the vehicle 20. In the example of FIG. 4, the vehicle 20 includes four motors 38a, 38b, 38c, 38d. For example, to move the vehicle 20 to the right relative to the user standing on the body 28, the processor 40 can actuate the motors 38a, 38c to rotate their respective wheels 36 forward and the motors 38b, 38d backward. In another example to move the vehicle 20 to the left relative to the user standing on the body 28, the processor can actuate the motor 38b to move the respective wheel 36 forward and actuate the motor 38c to hold the respective wheel 36 still. In yet another example, the user can move one of the hand grips 24 to rotate the vehicle 20 while not moving forward or backward. That is, when the user pushes the right hand grip 24 downward, the data collectors 58 send data to the processor 40 indicating the pushing of the right hand grip 24, and the processor 40 instructs the motors 38-38d to turn the wheels 36 relative to the chassis 34 and rotate the wheels 36 to move the vehicle 20 in a clockwise direction relative to the bar 22. When the user pushes the left hand grip 24 downward, the data collectors send data to the processor 40 indicating the pushing of the left hand grip 24, and the processor 40 instructs the motors 38a-38d to turn the wheels 36 relative to the chassis 34 and rotate the wheels 36 to move the vehicle 20 in a counterclockwise direction relative to the bar 22.

The processor 40 can collect data from the data collectors 58 that detect the rotation of the bar 22 and actuate the respective motors 38a-38d according to the detected rotation of the bar 22. Alternatively, the wheels 36 can be rotatably connected to the chassis 34 as described below in FIG. 5 such that when the user turns the bar 22, the processor 40 instructs the motors 38a-38d to turn the wheels 36 in the direction that the user turned the bar 22. That is, the processor 40 can instruct one or more of the motors 38a-38d to turn the vehicle 20 based on the rotation of the bar 22.

Figure 5:
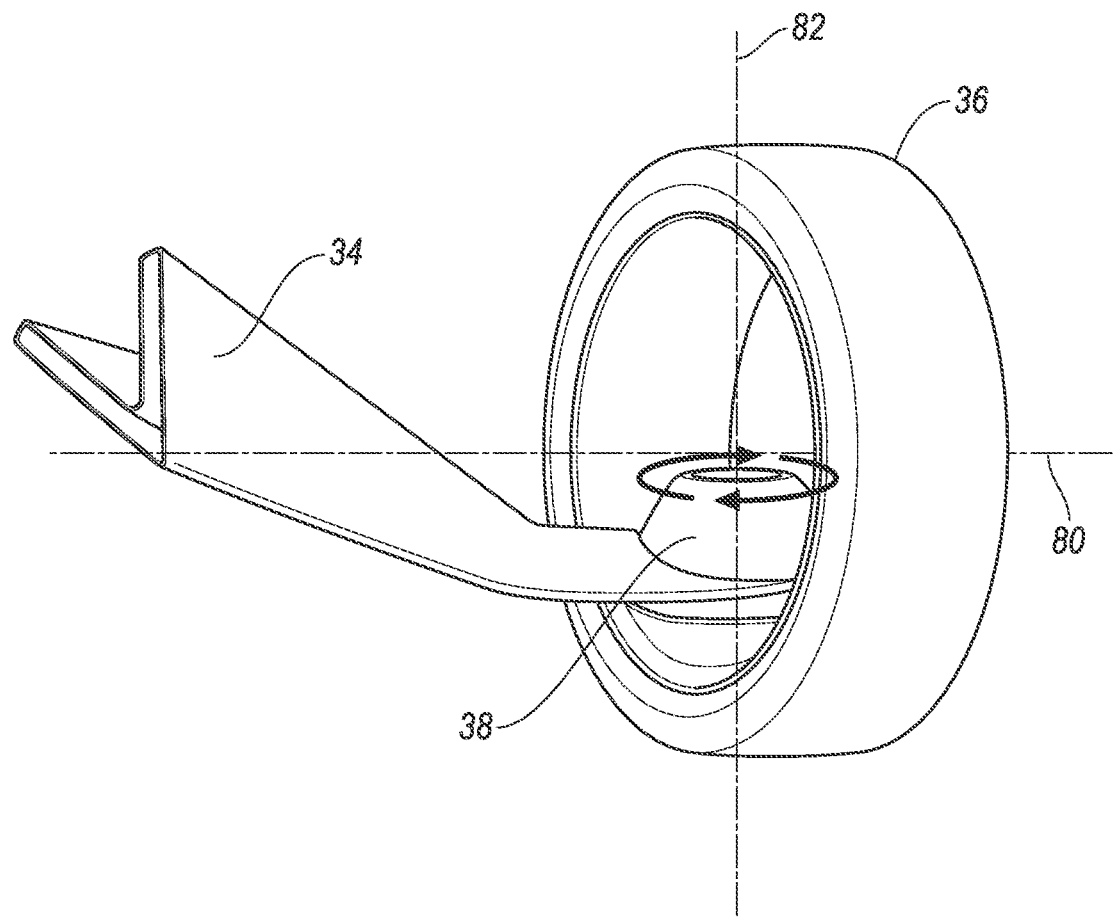
FIG. 5 is a view of one of the wheels of the example vehicle of FIG. 4.

FIG. 5 illustrates one of the wheels 36 of the vehicle 20 and one of the motors 38 attached to the wheel 36. The motor 38 includes a rotatable connection that connects the chassis 34 to the wheel 36. The motor 38 moves the wheel 36 along an axis of rotation 80 of the wheel 36, i.e., forward and backward, and along an axis of rotation 82 of the motor 38, i.e., to the left and to the right relative to the chassis 34. That is, the motor 38 can rotate the wheel 36 about the motor axis of rotation 82 to a substantially nonzero angle relative to the chassis 34, turning the wheel 36 to the left or to the right, and then can rotate the wheel 36 forward or backward, causing the vehicle 20 to turn. The motor 38 can receive instructions from the processor 40 to turn the wheel 36 according to data collected from data collectors 58 regarding the movement of the bar 22. That is, if the user pushes the bar 22 forward, the motor 38 then rotates the wheel 36 forward, moving the vehicle 20 forward. If the user rotates the bar 22 clockwise and pushes the bar 22 forward, the motor 38 then rotates the wheel 36 counterclockwise (i.e., around the motor axis 82) and rotates the wheel 36 forward (i.e., around the wheel axis 80), moving the vehicle 20 forward and to the right. If the user pulls the bar 22 backward, the motor 38 then rotates the wheel 36 backward, braking the vehicle 20 when the vehicle 20 is moving forward and moving the vehicle 20 backwards when the vehicle 20 is stationary.

Figure 6:
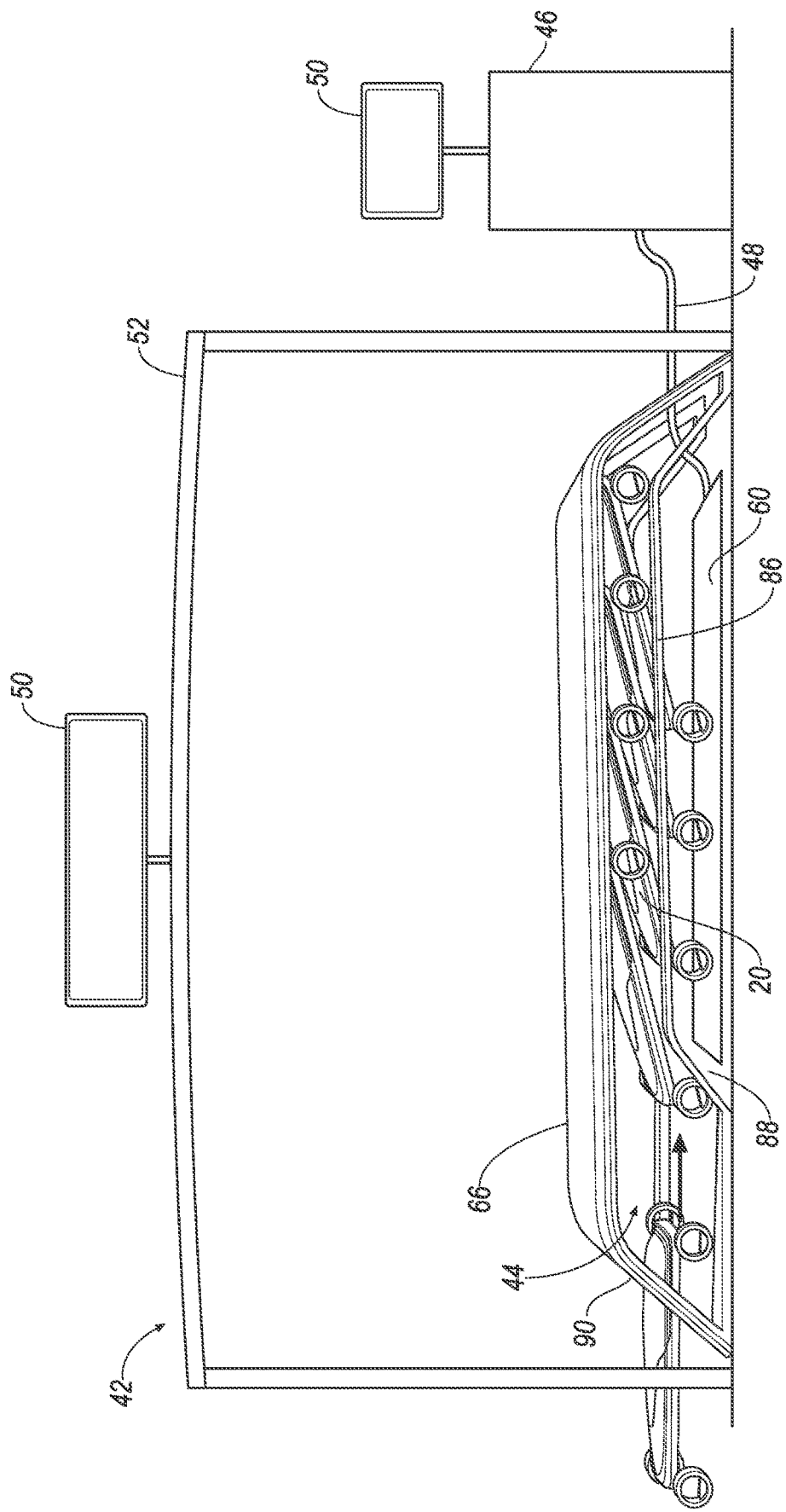
FIG. 6 illustrates an example station to house a plurality of vehicles.

FIG. 6 illustrates a station 42 for storing the vehicle 20. The station 42 stores a plurality of vehicles 20 when the user is not using one of the vehicles 20. A plurality of stations 42 can be constructed in a plurality of locations to allow users in more than one location to locate a vehicle 20 closest to each respective user. The station 42 can store vehicles 20 in the stowed position to allow more vehicles 20 to be stored at the station 42.

The station 42 includes a generally horizontal platform 66. The platform 66 can allow users to sit at the station 42. The platform 66 protects the vehicles 20 stored at the station 42 from, e.g., inclement weather. The platform 66 can be, e.g., a rigid bench on which a user can sit.

The station 42 includes a storage space 44 beneath the platform 66. The storage space 44 allows more than one vehicle 20 to be stored at the station 42. The storage space 44 can include a charging pad 60, e.g., a wireless charging pad, arranged to charge the battery 32 of the vehicle 20. That is, the charging pad 60 may generate an electromagnetic field to wirelessly charge the battery 32. To preserve space in the storage space 44, the storage space 44 can be arranged to only receive vehicles 20 that are in the stowed position, i.e., the cover 26 is in the stowed position as shown in FIG. 2.

The station 42 includes an opening 90 in the platform 66. The opening 90 is in communication with the storage space 44. The station 42 is designed to receive the vehicle 20 through the opening 90 into the storage space 44. The vehicle 20 moves through the opening 90 into the storage space 44.

The vehicles 20 can be stacked in the storage space 44, i.e., positioned so that at least a part of one vehicle 20 overlaps with a part of another vehicle 20. That is, the station 42 includes a pair of rails 86 spaced from each other in the storage space 44 and fixed relative to the platform 66. The rails 86 are elongated into the storage space 44 in a direction away from the opening 90. The station 42 includes a pair of ramps 88 ramping upwardly in the direction away from the opening 90 to the rails 86. The ramps 88 are fixed to the rails 86 in the storage space 44, connecting the platform 66 and the rails 86.

The front pair of wheels 36 engage the ramps 88, lifting a front end of the vehicle 20 above the ground and onto the rails 86. The motors 38 rotate the rear wheels 36 along the motor axis 82 inward to avoid the ramps 88 and remain on the ground, leaving a rear end of the vehicle 20 closer to the ground than the front end of the vehicle 10. That is, the ramps 88 direct the pair of front wheels 36 onto the rails 86 above a pair of rear wheels 36. Alternatively, the ramps 88 may ramp upwardly to direct the pair of rear wheels 36 onto the rails 86 above the pair of front wheels 36, i.e., the motors 38 rotate the front wheels 36 inward to avoid the ramps 88 while the rear wheels 36 engage the ramps 88.

By raising the front end of the vehicle 20 onto the rails 86, the ramps 88 allow the vehicles 20 to stack diagonally, i.e., at a nonzero angle with the ground. That is, the ramps 88 and the rails 86 are arranged to diagonally stack the vehicles 20, i.e., the rails 86 are arranged to allow a second vehicle 20 to stack diagonally on a first vehicle 20. Thus, a plurality of vehicles 20 can stack diagonally in the storage space 44 while allowing the vehicles 20 to move to and from the storage space 44 via the rails 86 and the ramps 88.

The station 42 can be connected to a power station 46. The power station 46 provides power to recharge the batteries 32 of the vehicles 20 stored in the station 42. The power station 46 can be connected to an electric power grid to provide electric power to the vehicles 20. The power station 46 can be connected to the changing pad 60 disposed in the storage space 44 beneath the rails 86 via a cable 48. The power station 46 can form an electrical connection directly to the vehicle 20 by connecting the cable 48 to the charging port 84 disposed in the body 28. The power station 46 can include at least one solar cell 50 to generate power to charge the batteries 32 of the vehicles 20. The solar cell 50 can be, e.g., a photovoltaic solar cell, a dye-sensitized solar cell, etc.

A canopy 52 can cover the station 42. The canopy 52 can be, e.g., a rigid covering disposed above the station 42. The canopy 52 can protect the station 42 and the vehicles 20 from, e.g., inclement weather. The canopy 52 can include another solar cell 50 and another cable (not shown) connecting the solar cell 50 to the charging pad 60 to charge the vehicles 20.

Figure 7:
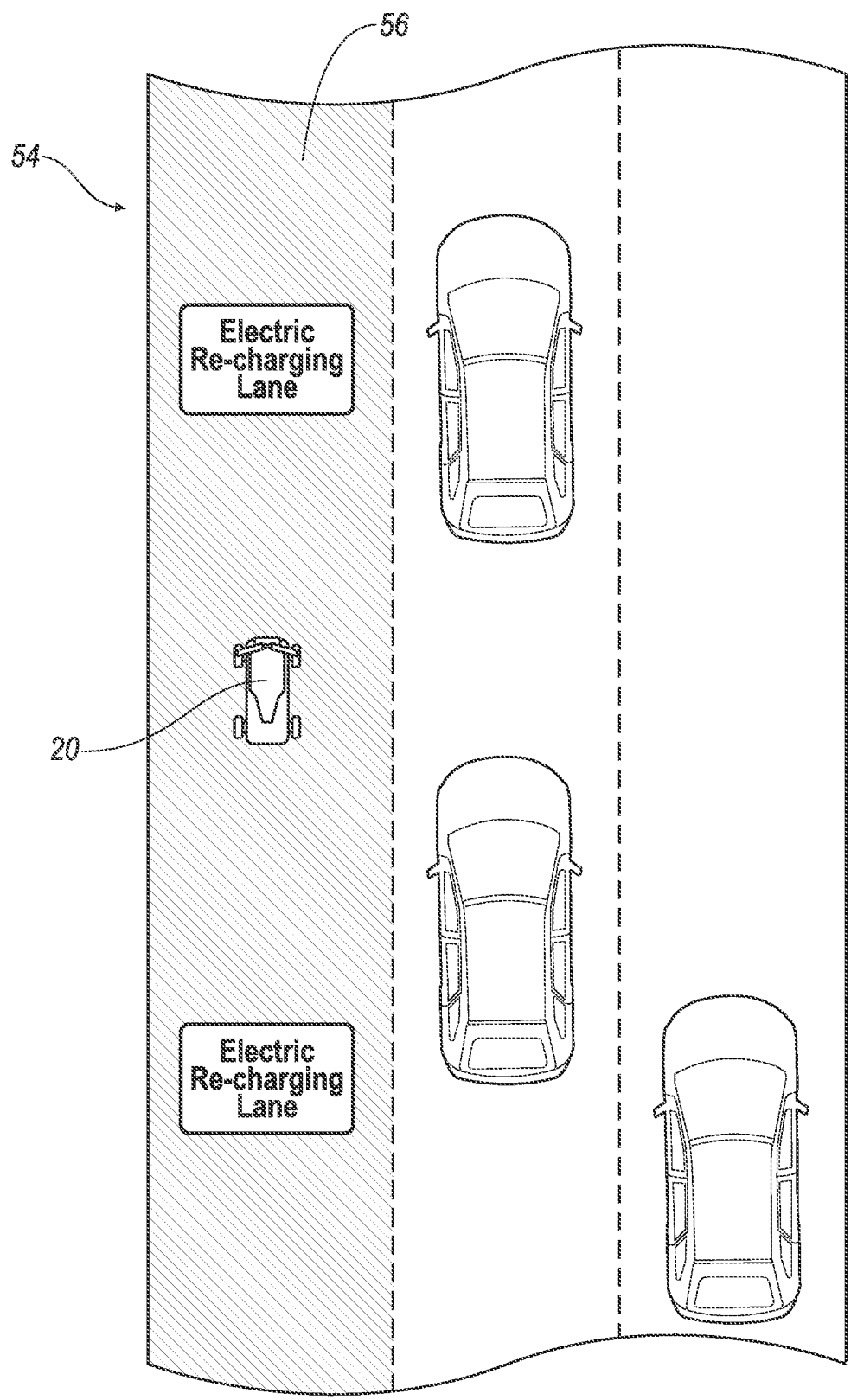
FIG. 7 illustrates a roadway including a lane to recharge a battery installed in the example vehicle of FIG. 1.

FIG. 7 illustrates an example roadway 54 on which the user can operate the vehicle 20. The roadway 54 can include a recharge lane 56. The recharge lane 56 can include, e.g., electrical cables disposed beneath a surface of the recharge lane 56 that generate electromagnetic fields to recharge the battery 32 of the vehicle 20 while the vehicle 20 moves along the recharge lane 56. The processor 40 can be programmed to select a route along which to move the vehicle 20 that includes the recharge lane 56 when, e.g., the user requests the vehicle 20 and the vehicle 20 locates the user.

Figure 8:
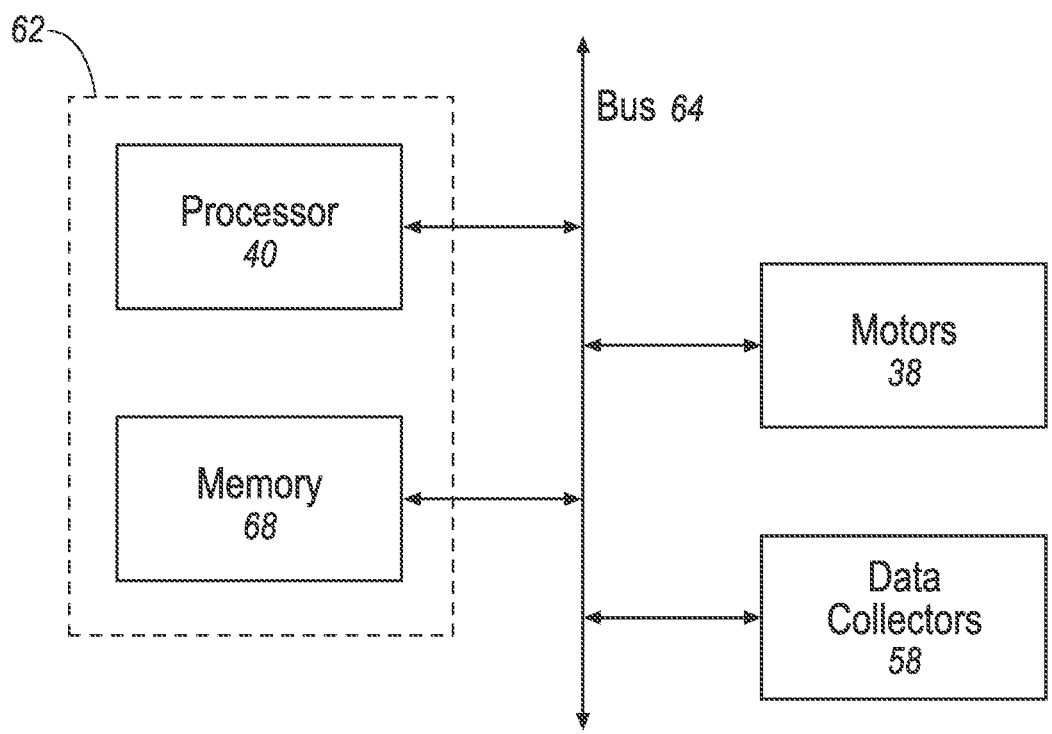
FIG. 8 illustrates a controller for actuating a vehicle motor.

FIG. 8 illustrates a controller 62 for actuating the motors 38. The controller 62 includes the processor 40 and a memory 68. The memory 68 stores instructions executable by the processor 40 to actuate the motors 38 according to data collected by the data collectors 58. The memory 68 may be of any known type, e.g., hard disk drives, solid state drives, servers, or any volatile or non-volatile media. The memory 68 can store the data sent from the data collectors 62.

Communications between the controller 62, the data collectors 58, and the motors 38 are typically provided via a communication bus 64, e.g., a controller area network (CAN) bus, of the vehicle 20. Via the bus 64, the processor 40 can transmit messages to various components in the vehicle 20 and/or receive messages from the various components, e.g., the data collectors 58. Alternatively or additionally, in cases where the processor 40 actually comprises multiple devices, the bus 64 can be used for communications between devices represented as the processor 40 in this disclosure. In addition, the processor 40 can be programmed for communicating with a network which may include various wired and/or wireless networking technologies, e.g., cellular, Bluetooth, wired and/or wireless packet networks, etc.

The controller 62 can use data from the bus 64 to control actuation of the motors 38. For example, data can include a location of the vehicle 20. Location data can be in a known form, e.g., geo coordinates (latitude and longitude coordinates) obtained by a navigation subsystem programmed in the processor 40, as is known, that uses a Global Position System (GPS). Further examples of data can include measurements of vehicle 20 systems and components, e.g., a vehicle 20 velocity, a vehicle 20 trajectory, angular rotation of the bar 22, lateral movement of the bar 22, etc.

Figure 9:
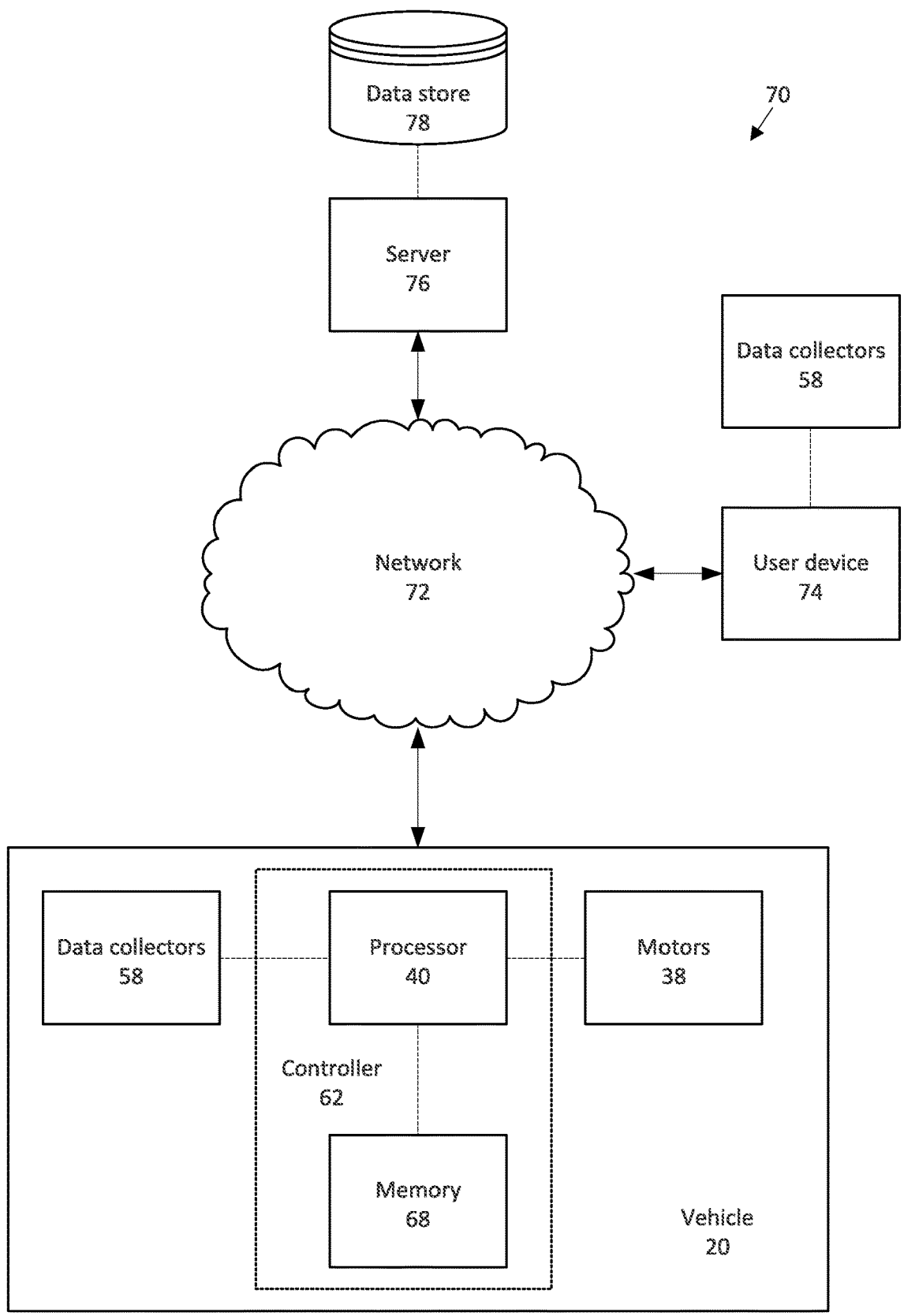
FIG. 9 illustrates a system for moving the example vehicle of FIG. 1 to a predetermined location.

FIG. 9 illustrates an exemplary system 70 for moving the vehicle 20 to a user. The system 70 includes a network 72 connected to a user device 74, a server 76, a data store 78, and the vehicle 20. The processor 40 can be programmed to communicate with one or more remote sites such as the server 76, via the network 72, such remote sites possibly including the data store 78. The network 72 represents one or more mechanisms by which the processor 40 may communicate with the server 76. Accordingly, the network 72 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The data store 78 may be of any known type, e.g., hard disk drives, solid state drives, servers, or any volatile or non-volatile media. The data store 78 can store the data sent from the processor 40 and/or the server 76.

The system 70 can include the user device 74. The user device 74 can be any one of a variety of computing devices including a processor and a memory, as well as communication capabilities. For example, the user device 74 can be a watch, a smart watch, a smartphone, a tablet, a digital assistant etc., which includes capabilities for wireless communications using IEEE 802.11, Bluetooth, and/or cellular communications protocols. That is, the user device 74 can be a wearable device, i.e., programmed to be worn on a user's body, or a non-wearable device, e.g., a smartphone. Further, the user device 74 can use such communications capabilities to communicate via the network 72 and also directly with the processor 40 of the vehicle 20, e.g., using Bluetooth. The user device 72 can include a data collector 58, e.g., a location sensor, an accelerometer, etc.

The server 76 can be programmed to determine an appropriate action for one or more vehicles 20, and to provide direction for the controller 62 of each vehicle 20 to proceed accordingly. The server 76 can be one or more computer servers, each generally including at least one processor and at least one memory, the memory storing instruction executable by the processor, including instructions for carrying out various steps and processes described herein. The server 76 can include or be communicatively coupled to the data store 78 for storing collected data. Further, the server 76 may store information related to particular vehicle 20 and additionally one or more other vehicles 20 operating in a geographic area, traffic conditions, user locations, etc., within a geographic area, with respect to a particular road, city, etc.

The user can request one of the vehicles 20 stored at the station 42 from a user device 74. Based on user input, e.g., requesting a vehicle 20, the user device 74 can send data including a predetermined location of the user to the server 76. The user device 74 then instructs the server 76 to locate a vehicle 20 at a station 42 closest to the location of the user. Upon locating the vehicle 20, the server 76 instructs the processor 40 of the vehicle 20 to move the vehicle 20 to the user location. When the user is finished with the vehicle 20, the user can provide input via the user device 74 to instruct the server 76 to return the vehicle 20 to another station 42. The server 76 may be programmed to locate the station 42 closest to the location of the vehicle 20 and instructs the processor 40 to actuate the motors 38 to move the vehicle 20 to the station 42 determined by the server 76.

Figure 10:
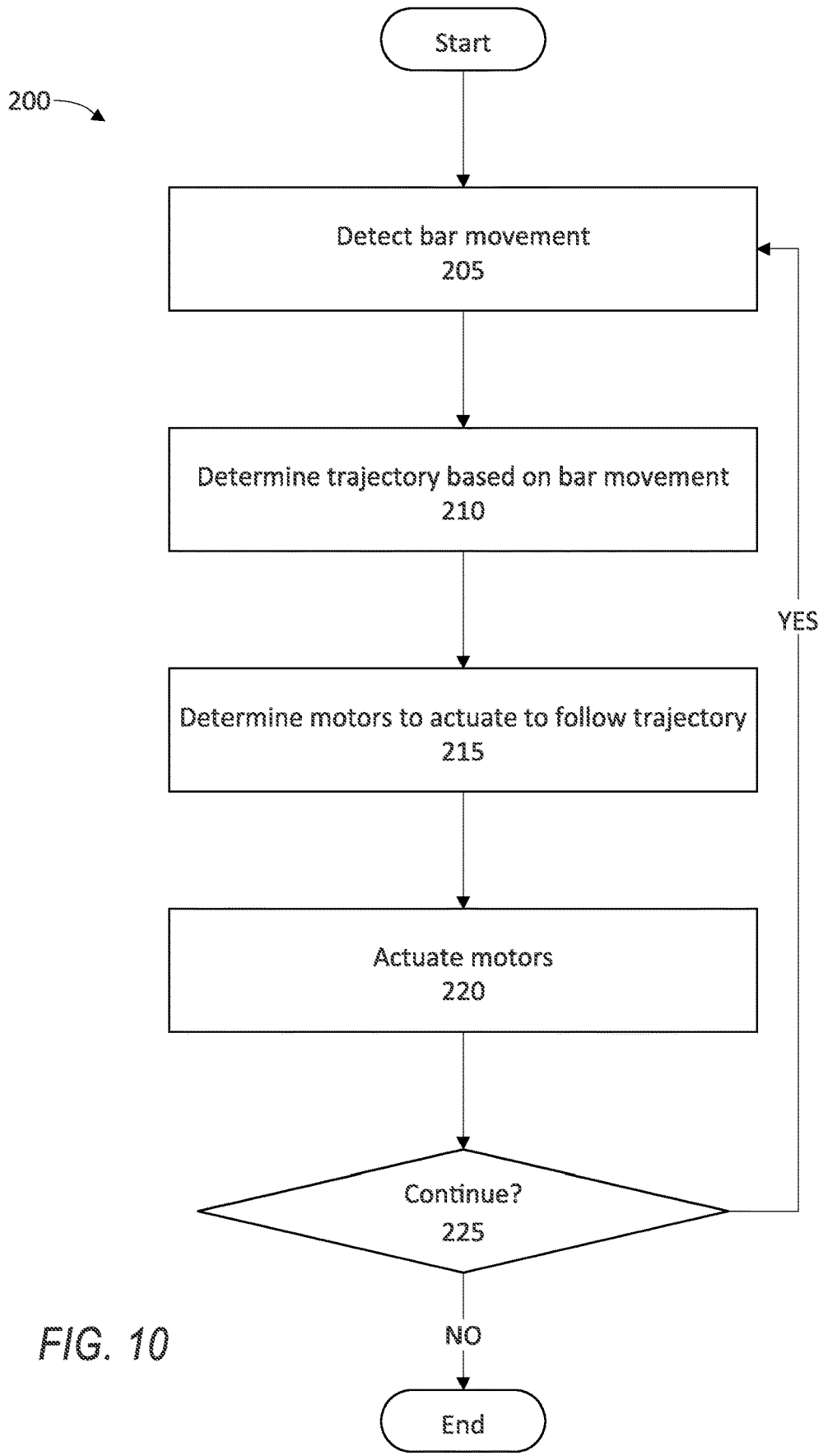
FIG. 10 illustrates a process for actuating the motor based on movement of a bar to turn the example vehicle of FIG. 1.

FIG. 10 illustrates a process 200 for turning the vehicle 20. The process 200 starts in a block 205, in which the processor 40 detects movement of the bar 22 by the user. That is, a rotation sensor 58 disposed in the bar 22 and in communication with the processor 40 sends data about movement of the bar 22 to the processor 40. The movement can be rotational movement, i.e., turning the bar 22 about a bar 22 axis, and/or lateral movement, i.e., moving the bar 22 forward or backward.

Next, in a block 210, the processor 40 determines a trajectory, i.e., a path of travel, of the vehicle 20 that the user intends to move the vehicle 20 based on the data from the rotation sensor 58. The processor 40 uses the trajectory to determine which motors 38 to actuate to move the vehicle 20. The intended trajectory is typically determined by detecting movement and/or orientation of the bar 22. For example, if the data indicate that the user rotated the bar 22 clockwise and pushed the bar 22 forward, the processor 40 determines that the user intends to move forward and to the right. Thus, the processor 40 determines the trajectory to move the vehicle 20 forward and to the right. In another example, if the data indicate that the user rotated the bar counterclockwise, then the processor 40 determines the trajectory to move the vehicle 20 to the left.

Next, in a block 215, the processor 40 determines the motors 38 to actuate to move the vehicle 20 according to the trajectory. Referring to the example of FIG. 4, if the processor 40 determines the trajectory to move the vehicle 20 to the right, the processor 40 can determine to actuate the motors 38a and 38b to rotate their respective wheels 36 to the right relative to the chassis 34, moving the vehicle 20 to the right. In another example, if the processor 40 determines the trajectory to move the vehicle 20 backward, the processor can determine to actuate the motor 38c to rotate the respective wheel 36 backward.

Next, in a block 220, the processor 40 actuates the motors 38 to move the vehicle 20 according to the trajectory. That is, the processor 40 instructs the motors 38 to rotate the respective wheels 36 to move the vehicle 20 according to the trajectory.

Next, in a block 225, the processor 40 determines whether to continue the process 200. For example, if the user moves the vehicle 20 to the stowed position or stops the vehicle 20, the processor 20 can determine not to continue the process 200. In another example, if the processor 40 determines that the user may move the bar 22 to move the vehicle 20 along a different trajectory, the processor 20 can determine to continue the process 200. If the processor 40 determines to continue, the process 200 returns to the block 205 to collect more data. Otherwise, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices, e.g., the controller 62, generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the controller 62 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 10. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising:
a station including a platform forming a storage space;
an opening in the platform in communication with the storage space and designed to receive a vehicle through the opening into the storage space;
a pair of rails spaced from each other in the storage space, the pair of rails being fixed relative to the platform and disposed beneath the platform, the pair of rails being elongated into the storage space in a direction away from the opening; and
a pair of ramps fixed to the rails in the storage space and ramping upwardly in the direction away from the opening to the rails.

2. The system of claim 1, further comprising a power station in the storage space arranged to charge a battery of a vehicle.

3. The system of claim 2, wherein the power station includes a photovoltaic solar cell.

4. The system of claim 2, wherein the power station is arranged to electrically connect to a charging port of the vehicle.

5. The system of claim 2, wherein the station includes a charging pad electrically connected to the power station, the charging pad arranged to wirelessly charge the battery.

6. The system of claim 5, wherein the charging pad is disposed in the storage space beneath the rails.

7. The system of claim 1, further comprising a canopy covering the station.

8. The system of claim 7, further comprising a photovoltaic solar cell supported on the canopy, and further comprising a power station in communication with the photovoltaic solar cell, the power station arranged to wirelessly charge a battery of a vehicle.

9. The system of claim 1, wherein the storage space is arranged to store a plurality of vehicles stacked on each other.

10. The system of claim 1, wherein the opening is designed to receive the vehicle in a stowed position.

\* \* \* \* \*